United States Patent [19]

Kawada et al.

[11] 4,080,555
[45] Mar. 21, 1978

[54] DRIVE CONTROL CIRCUIT FOR D.C. MOTOR

[75] Inventors: Takehiko Kawada; Moriaki Toyoda, both of Yokohama, Japan

[73] Assignee: Denki Onkyo Co., Ltd., Tokyo, Japan

[21] Appl. No.: 678,134

[22] Filed: Apr. 19, 1976

[30] Foreign Application Priority Data

Apr. 18, 1975 Japan ............................ 50-47844
Mar. 17, 1976 Japan ............................ 51-29684

[51] Int. Cl.² ...................... G05B 5/00; H02P 5/00
[52] U.S. Cl. ......................... 318/314; 318/318; 318/329
[58] Field of Search ................. 318/314, 318, 329

[56] References Cited

U.S. PATENT DOCUMENTS

| | | | |
|---|---|---|---|
| 2,932,778 | 4/1960 | Curtis | 318/318 |
| 3,110,853 | 11/1963 | Jones | 318/314 |
| 3,154,730 | 10/1964 | Houldin et al. | 318/314 |
| 3,298,622 | 1/1967 | Raymond et al. | 318/314 |
| 3,500,160 | 3/1970 | Sommer | 318/314 |
| 3,628,114 | 12/1971 | Pattantyus | 318/314 |
| 3,858,100 | 12/1974 | Bussi et al. | 318/314 |
| 3,931,556 | 1/1976 | Ban et al. | 318/318 |

Primary Examiner—B. Dobeck
Assistant Examiner—Eugene S. Indyk
Attorney, Agent, or Firm—Armstrong, Nikaido & Marmelstein

[57] ABSTRACT

The rotation of a motor is controlled to maintain a standard frequency from a standard frequency generator in synchronism with the frequency of a tachogenerator which is associated with the d.c. motor. In order to prevent the motor rotation from being stabilized at a number of revolutions other than a predetermined number of revolutions, there are provided an acceleration circuit and a stop circuit for forcedly controlling the motor rotation at the predetermined number of revolutions.

4 Claims, 18 Drawing Figures

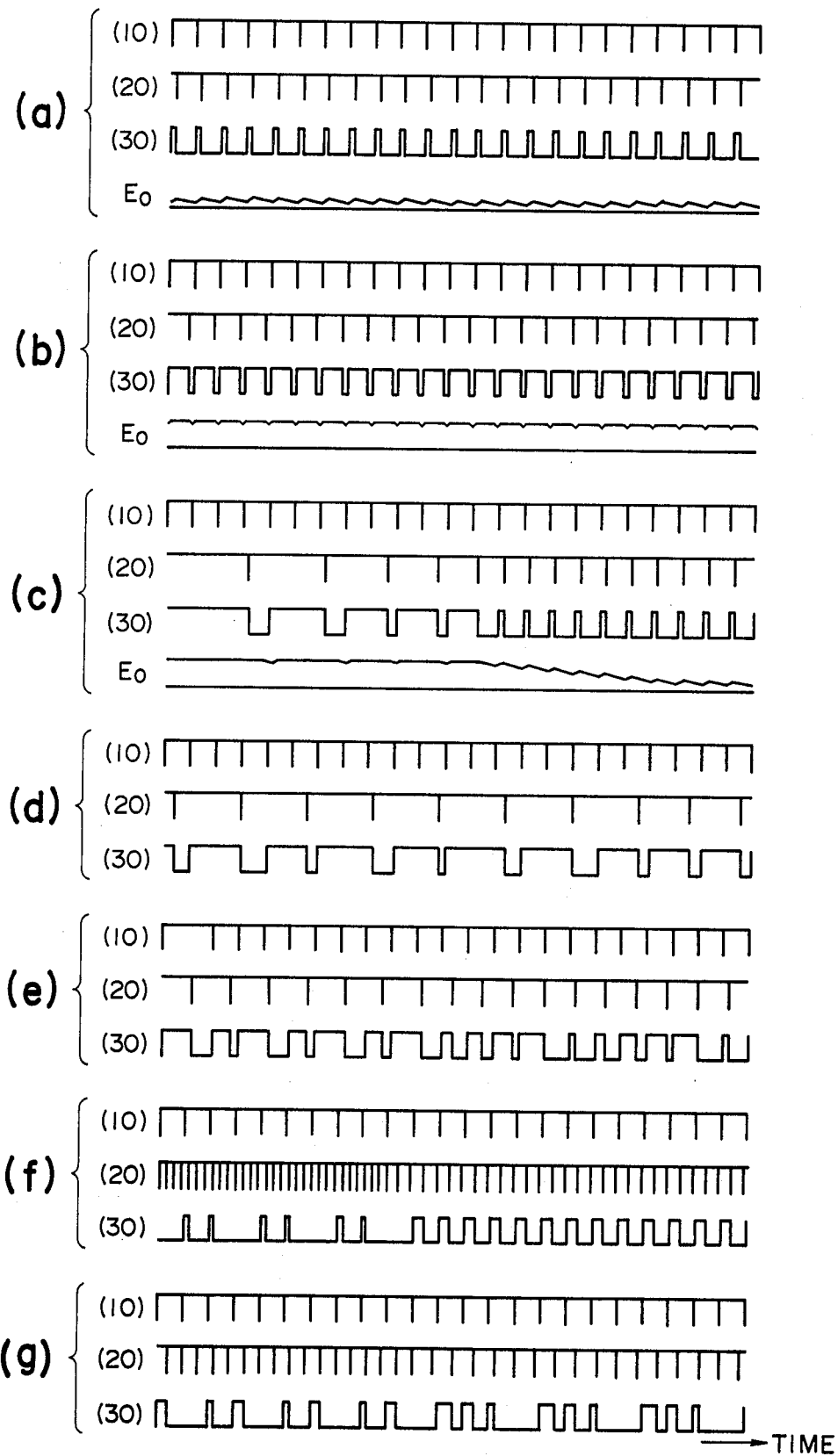

FIG. 9
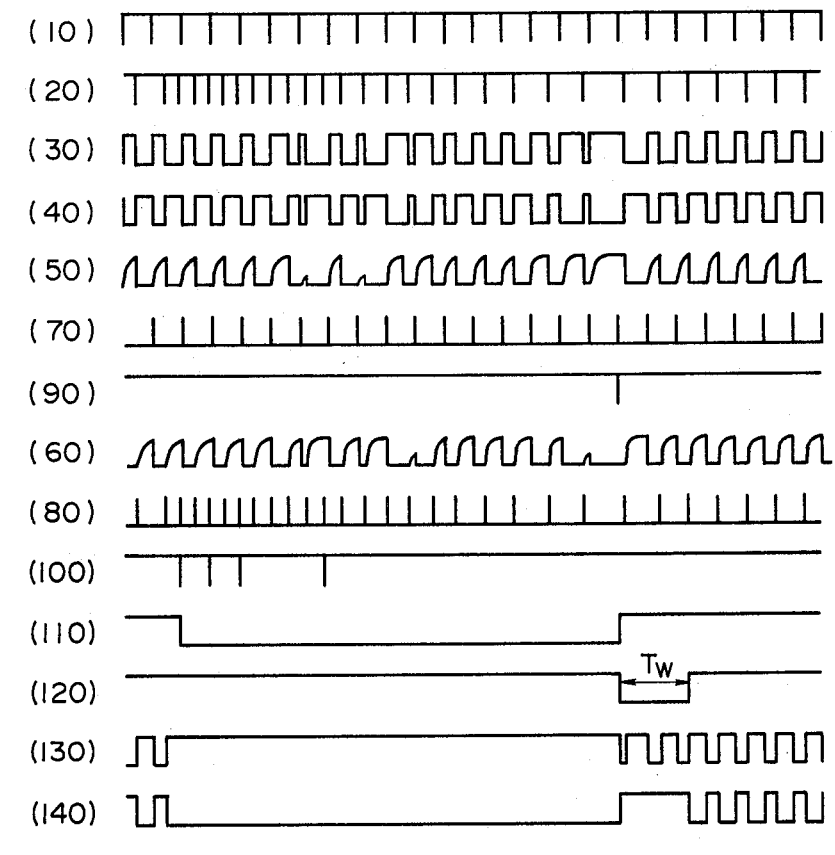
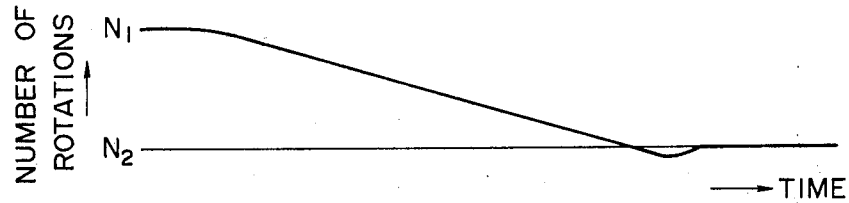

DRIVE CONTROL CIRCUIT FOR D.C. MOTOR

BACKGROUND OF THE INVENTION

This invention relates to a drive control circuit for d.c. motor, in particular, to a control circuit for driving a d.c. motor having its associated tachogenerator, in synchronism with a standard frequency.

Various schemes are proposed to rotate a d.c. motor at a constant speed, a typical one being a phase control scheme. In this scheme, the rotation of the motor is controlled so as to maintain the frequency from a tachogenerator which is mechanically connected with the motor in coincidence with a standard frequency from a standard frequency generator, as schematically shown in FIG. 1. Specifically, a phase discriminator PD has an input terminal 10 which is adapted to receive a standard frequency, and another input terminal 20 which is adapted to receive the frequency from a tachogenerator G associated with a d.c. motor M. Any difference between the input frequencies is detected to derive a voltage, which is amplified by a d.c. power amplifier A and applied to the motor M for controlling the speed thereof. In FIG. 1, the letter L designates a suitable load on the motor.

The phase discriminator PD can be constructed in various forms, and a motor control circuit is shown in FIG. 2 in which the phase discriminator comprises a set-reset RS flipflop circuit. The RS flipflop circuit FF has one input terminal 10 to which a standard frequency is applied and another input terminal 20 to which the frequency signal from the tachogenerator G is applied through a waveform shaping circuit WS. As is well recognized, when a low level (L) pulse is applied to the input terminal 10, an output H of a high level is produced and maintained at its output terminal 30 even if low level pulses subsequently applied to the input terminal 10. However, when a low level pulse is applied to the input terminal 20, the output of the flipflop circuit is inverted to a low level L, and such output level is maintained even if low level are subsequently applied to the input terminal 20. In other words, the output of the RS flipflop circuit FF changes between levels H and L if the frequency signal from the tachogenerator G appears within the period of the standard frequency. When the frequency signal from the tachogenerator G gains in phase with respect to the standard frequency signal, the pulse width at the output 30 of the flipflop circuit FF will be reduced while it will be increased when the phase of the frequency signal from the tachogenerator G becomes lagging. If the frequency signal from the tachogenerator G appears at the middle point of the pulse interval of the standard frequency signal, the output of the flipflop circuit FF will be at its high and low levels for an equal interval which is just one-half the pulse interval of the standard frequency signal. FIG. 3 shows various conditions of the control circuit shown in FIG. 2. In FIG. 3(a), the frequency signal from the tachogenerator is slightly lagging in phase with respect to the standard frequency signal, so that the output of the RS flipflop circuit FF will have a reduced pulse width. As a consequence, an average output voltage $E_0$ of an integrator INT (see FIG. 29 which integrates such pulses is low. In FIG. 3(b), the phase lag of the tachogenerator signal with respect to the standard frequency signal is increased, whereby the output pulse of the RS flipflop circuit FF will have an increased width, thus increasing the average output voltage $E_0$. In this manner, the control circuit provides a feedback in a manner such that the operation is stabilized at a phase which is determined by the overall system. Specifically, the phase control will be effective in a range from 0 to $-2\pi$ as represented in terms of a phase difference between the standard and tachogenerator frequency signals, and a stable motor rotation is possible through the phase control within such range.

FIG. 3(c) illustrates a starting operation of the motor, illustrating the phase control during the time the motor rotation gradually increases from its stop condition to a number of rotation at which the frequency signal from the tachogenerator G becomes equal to the standard frequency. However, in practice, the output of the RS flipflop undergoes a repetition of H and L signals having varying pulse widths until the tachogenerator frequency reaches the standard frequency, as illustrated in FIGS. 3(d) and (e). This involves the possibility that the motor rotation may reach a condition of equilibrium at which the tachogenerator frequency is below the standard frequency, depending on the magnitude of the load on the motor and the moment of inertia of the system. The motor rotation may be fixed to a given number of revolutions, or may increase and decrease periodically within a given range of numbers of revolutions. As will be appreciated, the motor rotation may be reduced to one-half its initial value by changing the standard frequency to one-half its initial value or by subjecting the tachogenerator frequency signal to a full wave rectification to provide a doubled frequency. In this instance, however, since the motor rotation gradually reaches the final number of revolutions which is one-half the initial value after repeating H and L signals of varying pulse widths, as shown in FIGS. 3(f) and (g), again there is the possibility that the motor rotation may not reach a desired number of revolutions by becoming balanced at a different number of revolutions which depends on the magnitude of the load and the moment of inertia. Additionally, with the circuit shown in FIG. 2, it takes a considerable length of time to reach a desired number of revolutions since an increase or decrease in the number of revolutions involves a repetition of H and L signals.

SUMMARY OF THE INVENTION

It is an object of the invention to provide a control circuit for d.c. motor which maintains the motor rotation at a predetermined number of revolutions in a stable manner.

It is another object of the invention to provide a drive control circuit for d.c. motor which rapidly brings up the motor rotation to a predetermined number of revolutions during a starting operation thereof and which maintains the motor rotation at the predetermined number of rotation in a stable manner.

It is a further object of the invention to provide a drive control circuit for d.c. motor which reliably increases the motor rotation to a predetermined number of rotations during a starting operation thereof, while preventing the motor rotation from being stabilized at an intermediate number of revolutions.

It is still another object of the invention to provide a drive control circuit for d.c. motor which prevents the motor rotation from being locked at an intermediate stabilized point when it is desired to reduce the number of revolutions of the motor from a higher to a lower value.

It is a still further object of the invention to provide a drive control circuit for d.c. motor which maintains a stable operation of the motor at a predetermined number of revolutions for all and varying load conditions.

In accordance with the invention, the drive control circuit for d.c. motor comprises a phase control condition detection circuit for detecting whether or not an RS flipflop circuit is receiving pulses at its input terminals alternately from a standard frequency generator and a tachogenerator associated with the d.c. motor, an acceleration circuit operative when an increase in the number of revolutions of the motor is desired to accelerate the motor so as to prevent the motor rotation from being locked at an intermediate stable point, and a stop circuit operative when a decrease in the number of revolutions of the motor is desired to interrupt a drive current for the motor completely so as to prevent the motor rotation from being locked at an intermediate stable point.

BRIEF DESCRIPTION OF THE DRAWINGS

FIGS. 3(a) to (h) are a series of waveform diagrams illustrating various operations of the control circuit shown in FIG. 2;

FIG. 9 shows a series of waveforms which appear in various parts of the circuit shown in FIG. 4 when the motor rotation is reduced from a higher to a lower number of revolutions;

DETAILED DESCRIPTION OF PREFERRED EMBODIMENTS

Figure 1:
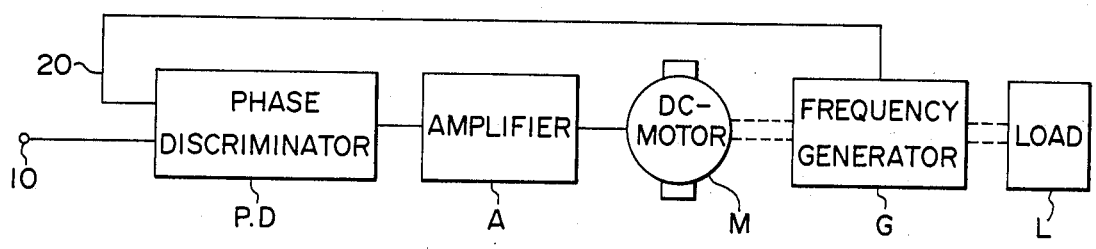
FIG. 1 is a schematic circuit diagram of a conventional drive control circuit for d.c. motor.
Figure 2:
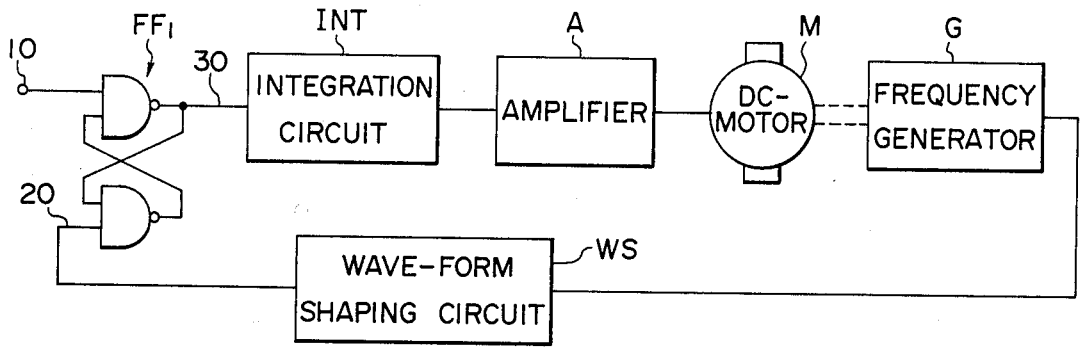
FIG. 2 is a more detailed block diagram of a conventional control circuit shown in FIG. 1 in which an RS flipflop circuit is used as a phase descriminator.
Figure 4:
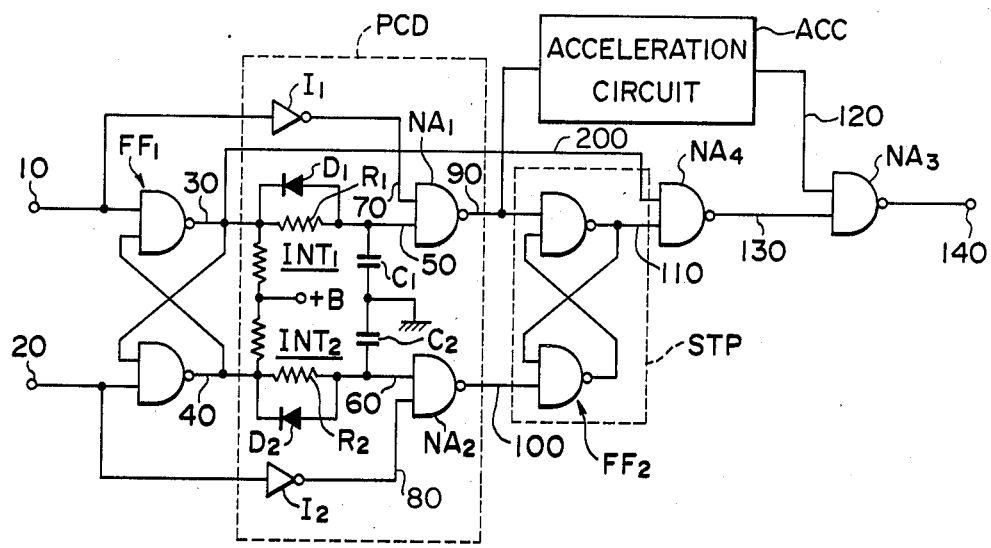
FIG. 4 is a circuit diagram of a drive control circuit for d.c. motor which is constructed in accordance with one embodiment of the invention.

Referring to FIG. 4, there is provided a phase control condition detector circuit PCD which comprises a pair of integrator circuits $INT_1$ an $INT_2$, a pair of diodes $D_1$ and $D_2$, a pair of inverters $I_1$ and $I_2$, and and a pair of NAND gates $NA_1$ and $NA_2$. The integrator circuits $INT_1$ and $INT_2$ are connected with outputs 30 and 40 of an RS flipflop $FF_1$, respectively, and have their outputs 50 and 60 connected with one input terminal of NAND gates $NA_1$ and $NA_2$, respectively. The integrator circuits $INT_1$ and $INT_2$ comprises a resistor $R_1$ or $R_2$ and a capacitor $C_1$ or $C_2$, respectively. Each of NAND gates $NA_1$ and $NA_2$ forms an NAND product of an output 50 or 60 of the integrator circuit $INT_1$ or $INT_2$, and an output 70 and 80 of the inverter $I_1$ or $I_2$, which is utilized to reverse the phase of the pulse that is applied to the respective input 10 or 20 of the RS flipflop $FF_1$. $C_1R_1$ and $C_2R_2$ in the integrator circuits provides a delayed H signal (high level signal) to the input of NAND gates $NA_1$ and $NA_2$, respectively. Diodes $D_1$ and $D_2$ are connected across the resistors $R_1$ and $R_2$, respectively, and provides an integrating effect for the rising edge and a rapid discharging effect for the charge stored on the capacitors $C_1$ and $C_2$ for the falling edge.

Figure 5:
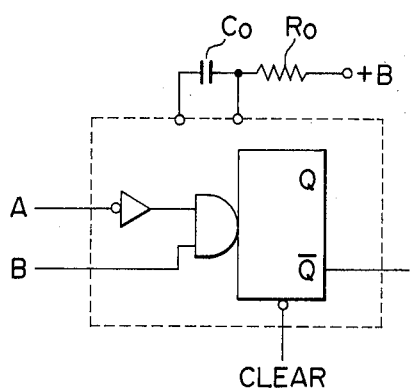
FIG. 5 is a simplified circuit diagram showing one example of the acceleration circuit which may be used in the arrangement of FIG. 4.

An acceleration circuit ACC may comprise a retiggerable monostable multivibrator, for example. FIG. 5 shows a specific example of such retriggerable multivibrator. Specifically, during the time an input signal is applied to its input terminal A at a given pulse interval, an output terminal $\overline{Q}$ is maintained at a low level L. Another input terminal B is maintained at a high level H. The retriggerable monostable multivibrator has an operating period Tw which is determined by a resistor $R_0$ and a capacitor $C_0$, both of which are connected as an external circuit. The retriggerable monostable multivibrator may comprise a conventional commercially available multivibrator which is manufactured and sold as model SN7123 by Texas Instruments Company, and either of two versions may be used.

Figure 6:
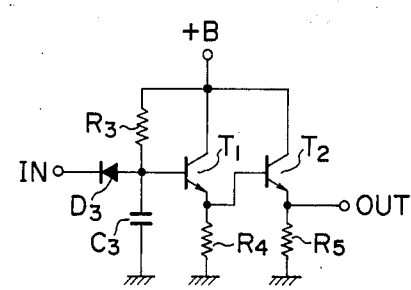
FIG. 6 is a circuit diagram of another example of the acceleration circuit.

FIG. 6 shows another example of the acceleration circuit ACC. In this instance, there are provided a pair of discrete NPN transistors $T_1$ and $T_2$, which have their collectors connected with a common source Vcc. A resistor $R_3$ is connected between the collector and the base of the transistor $T_1$, and the base of the transistor $T_1$ is connected with an output terminal 90 of NAND gate $NA_1$ through a diode $D_3$ and also connected with the ground through a charging capacitor $C_3$. The emitter of the transistor $T_1$ is connected with the ground through a resistor $R_4$ and is also connected with the base of the transistor $T_2$, which has its emitter connected with the ground through a resistor $R_5$ and also connected with an input terminal 120 of NAND gate $NA_3$. In the circuit shown, the output is maintained at a low level L during the time an input pulse continues to be applied at a given pulse interval. The acceleration circuit ACC receives an input pulse from the output terminal 90 of NAND gate $NA_1$ in the phase control condition detector circuit PCD, and supplies its output signal to the input terminal 120 of NAND gate $NA_3$.

A stop circuit STP may comprise an RS flipflop $FF_2$, for example. The stop circuit STP receives an input signal from the phase control condition detector circuit PCD, and applies its output signal to an input terminal 110 of NAND gate $NA_4$, which also receives another input signal from the output terminal 30 of RS flipflop $FF_1$. The output of NAND gate $NA_4$ is supplied to one input terminal 130 of NAND gate $NA_3$, the output terminal 140 of which is connected with a d.c. motor drive circuit.

Figure 7:
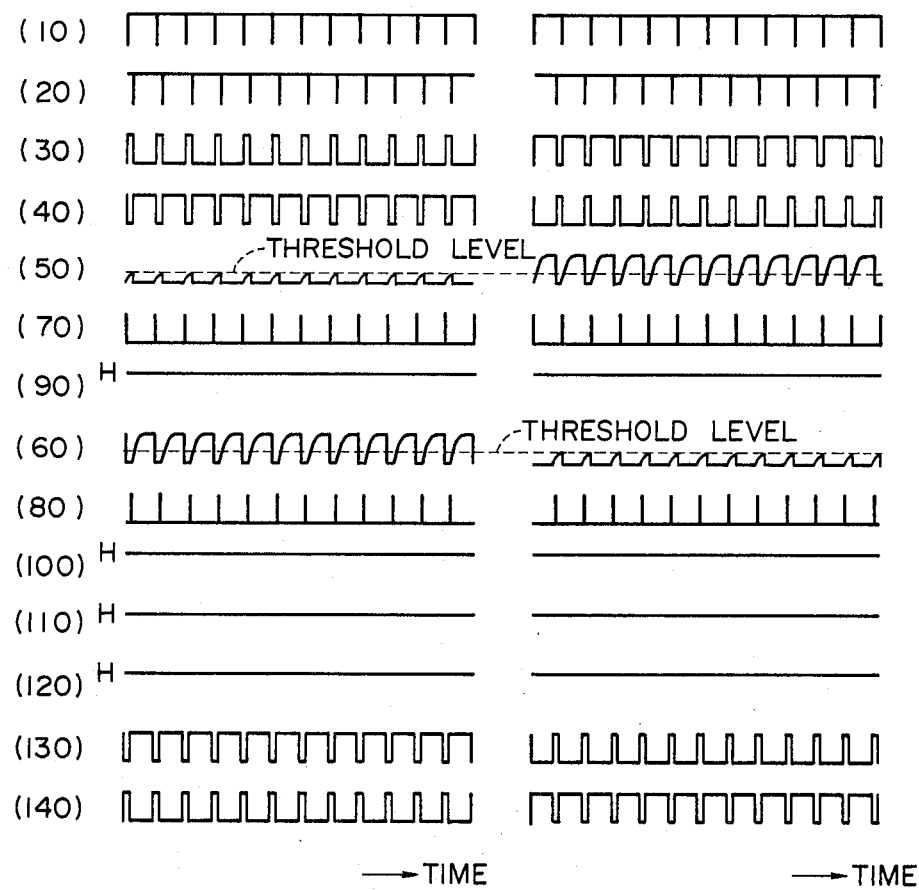
FIG. 7 shows a series of waveforms which appear in various parts of the circuit shown in FIG. 4 during different phase controlled conditions.

FIG. 7 shows a series of waveforms which appear in the various parts of the circuit shown in FIG. 4 during different phase controlled conditions. It should be noted that each of these waveforms is designated by a numeral which is employed to represent the corresponding part shown in FIG. 4 where it appears. In a phase controlled condition, no output is produced at the outputs 90 and 100 of the detector circuit PCD. As a consequence, the output 140 from NAND gate $NA_3$ comprises pulses spaced apart by a constant interval, with result that only the waveform of the phase lock loop PLL will be produced, thereby maintaining the motor rotation at a constant value. In FIG. 7, it should be noted that the waveforms shown on the left- and right-hand sides correspond to different values of the phase lag of the tachogenerator frequency signal with respect to the standard frequency signal.

The operation of the circuit shown in FIG. 4 is in a phase controlled state (See FIGS. 4 and 7) as follows: One input terminal 10 of flipflop $FF_1$ receives a standard frequency signal (10) which is a low level pulse from a standard frequency generator and the other input terminal 20 receives a frequency signal (20) which is a low level pulse from a tachogenerator. Standard signal (10) and frequency signal (20) are applied alternately to input terminals 10 and 20. Therefore, high level pulse (30) is produced at output terminal 30 and high level pulse (40) is similarly produced at output terminal 40.

However, when a pulse of standard frequency signal is applied to input terminal 70 of NAND gate $NA_1$ through invertor $I_1$ which is utilized to reverse the phase of pulse (10), capacitor $C_1$ in integrator circuit $INT_1$ begins simultaneously to charge from pulse (30) from output terminal 30 to form waveform (50) in FIG. 7. Under this condition, since input terminal 50 of NAND gate $NA_1$ receives output (50) of integrator circuit $INT_1$ which takes a potential level which is lower than threshold level of gate $NA_1$, that is, a low level signal at the same time as that of pulse (1), output (90) of NAND gate $NA_1$ is successively maintained at a high level as shown in FIG. 7.

A pulse of the signal from the tachogenerator is inverted to a high level pulse by inverter $I_2$ and is applied to input terminal 80 of NAND gate $NA_2$.

However, when input terminal 80 receives a high level pulse through inverter $I_2$, capacitor $C_2$ in integrator circuit $INT_2$ starts simultaneously to charge from the pulse (40) from output terminal 40 to waveform (60) in FIG. 7, so that, in the same instant as the production of pulse (20), output (60) of integrator circuit $INT_2$ has a potential level which is lower than the threshold level of NAND gate $NA_2$. As a result, output (100) of gate $NA_2$ continues to be maintained at a high level as shown in FIG. 7. Therefore, no pulse signal is produced at output terminal 90 and 100 of detector circuit PCD.

Under the above condition, since input (90) of the acceleration circuit ACC is maintained at a high level H, its output terminal (120) is maintained at a high level, too. (See waveform (120) in FIG. 7). Also, since output terminals 90 and 100 are maintained at a high level, two input terminals 90 and 100 of stop circuit STP are simultaneously supplied the high level signal, and output 110 of flipflop $FF_2$ is continually maintained at a high level without causing an inversion of flipflop $FF_2$. (See waveform (110) of FIG. 7).

Thus, input terminal 110 of the NAND gate $NA_4$ is maintained at a high level and the other input terminal 200 is applied waveform (30) of FIG. 7 by output 30 of flipflop $FF_1$ to produce waveform (130) to output 130 of NAND gate $NA_4$.

Consequently, since input terminal 120 of gate $NA_3$ is maintained at a high level and input terminal 130 of gate $NA_3$ is supplied waveform (130), output terminal 140 of gate $NA_3$ produces pulse of waveform (140) in FIG. 7 spaced apart by a constant interval, with that only waveform (140) of phase lock loop PLL will be produced, thereby maintained the motor rotation at a constant value.

Figure 8:
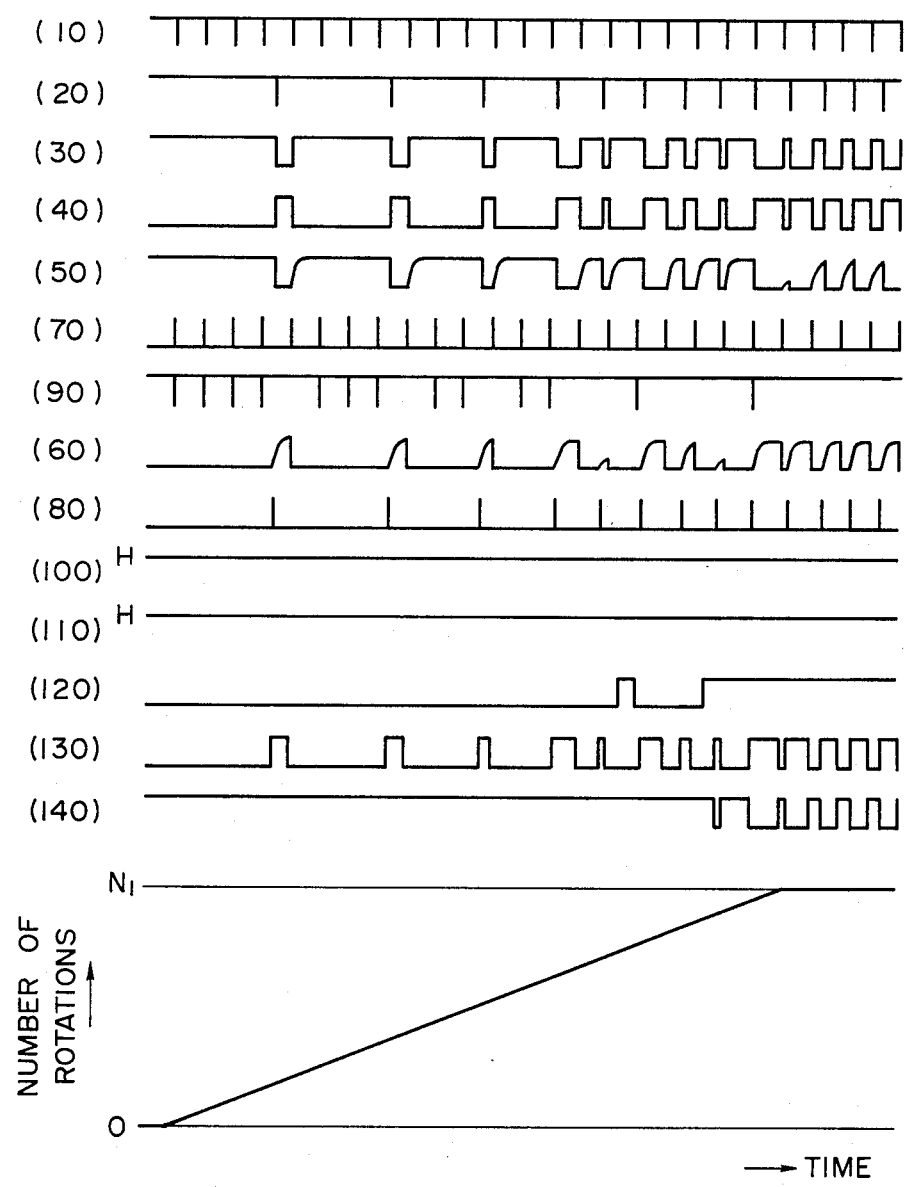
FIG. 8 shows a series of waveforms which appear in various parts of the circuit shown in FIG. 4 when the motor is started and accelerated to a predetermined number of revolutions.

FIG. 8 shows a series of waveforms which appear in the various parts of the circuit shown in FIG. 4 when the motor is accelerated from its stop condition to a predetermined number of revolutions. In this instance, a low level pulse is produced at the output 90 of the detector circuit PCD as shown, thereby operating the acceleration circuit ACC and triggering the stop circuit STP. The output 110 of the stop circuit STP assumes an H level, and since the output 30 of RS flipflop $FF_1$ also assumes an H level, the output 130 of NAND gate $NA_4$ will assume an L level. As a consequence, the output of NAND gate $NA_3$ is at its H level while the output 120 of the acceleration circuit ACC is at its L level. This output of NAND gate $NA_3$ is the same as the output 30 of RS flipflop $FF_1$. Consequently, the motor rotation can be brought up to a predetermined number of revolutions $N_1$ without being locked at an unintended, stabilized point during the course of increasing the motor speed.

The operation of the circuit of FIG. 4 to accelerate the motor from its stop condition to a predetermined number of revolutions is as follows: (See FIGS. 4 and 8). When starting the motor, more than one low level pulse will be applied to terminal 10 until an initial low level pulse appears at input terminal 20. (See waveforms (1) and (2) in FIG. 8). Therefore, one output terminal 30 of flipflop $FF_1$ produces output (30) which is almost formed at a high level and the other output terminal 40 produces output (40) which is nearly formed at a low level.

Under this condition, capacitor $C_1$ in integrator circuit $INT_1$ is fully charged, so that input terminal 50 of gate $NA_1$ is practically maintained at a high level. Conversely, since capacitor $C_2$ in integrator circuit $INT_2$ is insufficiently charged, input terminal 60 of gate $NA_2$ is nearly maintained at a low level. Consequently, when input terminal 50 of gate $NA_1$ is maintained at a high level, pulse (90) in FIG. 8 appears at output 90 of gate $NA_1$, since pulse (10) of input terminal 10 is applied simultaneously to input terminal 70 of gate $NA_1$ through invertor $I_1$.

Signal (60) in FIG. 8 is applied to input terminal 60 of gate $NA_2$. However, when input terminal 80 of gate $NA_2$ receives high level pulse (80) in FIG. 8 through invertor $I_2$ from input terminal 20, output (60) of integrator circuit $INT_2$ instantaneously takes a potential level which is lower than the threshold level of gate $NA_2$ to cause output 100 of gate $NA_2$ to be maintained at a high level and is applied to input terminal 60. (See waveform (100) in FIG. 8). Consequently, output 110 of flipflop $FF_2$ is maintained at a high level whether output 90 has a high level signal or not. Also, an input terminal of the acceleration circuit ACC receives more than one pulse (90) in succession from output 90 to cause its output terminal 120 to be maintained at a low level.

One input 110 of gate $NA_4$ is continuously maintained at a high level and the other input 200 is applied output (30) of output terminal 30, thereby causing output 130 of gate $NA_4$ to be produced output (130) in FIG. 8. However, since input 120 of gate $NA_3$ is maintained at a low level, output terminal 140 of gate $NA_3$ produces output (140), thereby continually energizing the motor until the motor rotation reaches the predetermined number of revolutions $N_1$.

When the motor rotation is reduced from a higher value $N_1$ to a lower value $N_2$, a low level pulse is produced at the output 100 of the detector circuit PCD as shown in FIG. 9. The initial pulse from the output 100 turns the stop circuit STP off, so that the output 140 of NAND gate $NA_3$ is maintained at its low level as shown, deenergizing the motor. Consequently, the motor speed decreases gradually in a manner dependent on its inertia, and ultimately decreases below $N_2$. At this point a low level pulse is produced at the output 90 of the detector circuit PCD as shown, which pulse triggers the stop circuit STP to turn it on, thus changing the output 140 from NAND gate $NA_3$ as shown to thereby energize the motor. In this manner, the motor rotation is caused to converge to the intended lower number of revolutions $N_2$. In this manner, it is assured that when reducing the motor speed, the number of revolutions passes through $N_2$ to a lower value, and then increases to converge to $N_2$. As a result, the waveform shown at 30 of FIG. 9 represents a final output which is supplied to the d.c. motor drive circuit to energize the motor, thus completely eliminating the possibility that the motor rotation may be locked at an intermediate, stabilized point between $N_1$ and $N_2$ or the possibility of a hunting phenomenon that the motor rotation may periodically wander about an unintended number of revolutions.

As will be understood from the waveform shown at 30 of FIG. 8, when the standard frequency is sufficiently higher than the tachogenerator frequency, the waveform 30 will be at its H level for a sufficient interval of time to derive a signal which is required to maintain the motor in rotation, so that the acceleration circuit ACC may not be essential. In other words, the provision of the acceleration circuit is not essential where there prevails more than marginal relationship between the torque, the number of revolutions and the supply voltage. Thus, the invention permits the motor to be brought into synchronism with a standard frequency with a simple arrangement of the control circuit.

The operation of the circuit of FIG. 4 to produce a reduction of the motor rotation from a higher value $N_1$ to a lower value $N_2$ is as follows (See FIGS. 4 and 9). When a switch which changes the motor rotation to another number of revolutions (not shown) was changed from a change-over contact of higher valve $N_1$ to a change-over contact of lower value $N_2$, the standard frequency which is applied to input terminal 10 of flipflop $FF_1$ is lower than the frequency supplied by the tachogenerator to input terminal 20 of flipflop $FF_1$.

As a consequence, more than one low level pulses are applied in succession to terminal 20 from the tachogenerator. Under this condition, an energy of output (40) of terminal 40 produced by initial low level pulse (20) is fully charged on capacitor $C_2$ in integrator circuit $INT_2$ for supplying a high level to input terminal 60 of gate $NA_2$, and when input terminal 60 receiver a high level pulse and simultaneously a secondary low level pulse (20) provides a high level pulse applied to input terminal 80 through invertor $I_2$, pulse (100) appears at output terminal 100 of gate $NA_2$.

Conversely, capacitor $C_1$ in integrator circuit $INT_1$ is started to charge from output (30) of flipflop $FF_1$ and pulse (10) is applied to terminal 10 is supplied simultaneously to input terminal 70 of gate $NA_1$ through invertor $I_1$. Therefore, output terminal 90 of gate $NA_1$ is continuously maintained at a high level.

As a result, output terminal 120 of acceleration circuit ACC is maintained at a high level, and stop circuit STP is inverted by initial low level pulse (100) of terminal 100, so that output (110) of flipflop $FF_2$ is inverted to a low level and maintained at such level, whereby output (130) of gate $NA_4$ is maintained at a high level, though input terminal 200 of gate $NA_4$ receives output (30) from terminal 30. Thus, since inputs 120 and 130 of gate $NA_3$ respectively are applied outputs (120) and (130), output (140) of gate $NA_3$ is maintained at a low level (140) during an interval which is deenergized the motor, thereby reducing the motor rotation.

When the motor speed decreased below $N_2$, a pair of low level pulses from a standard frequency below generator are applied to input terminal 10 in succession. At this point, since one low level pulse (90) is produced at output terminal 90 of gate $NA_1$, and a high level (100) is maintained at output terminal 100 as shown, output (120) of acceleration circuit ACC is changed at a low level during its operating period Tw which is determined by resistor Ro and capacitor Co shown in FIG. 5 or resistor $R_3$ and capacitor $C_3$ shown in FIG. 6 though stop circuit STP is triggered to invert its output at a high level.

Consequently, during operating period Tw of acceleration circuit ACC, output (140) of gate $NA_3$ is maintained at a high level thereby energizing the motor to converge to the predetermined number of revolutions $N_2$. Since input terminal 200 of gate $NA_4$ is supplied output (30) of terminal 30, output (130) in FIG. 9 appears at output terminal 130 of gate $NA_4$. As a result, after period Tw, output terminal 140 of gate $NA_3$ produces output (140) which repeats alternately a high level and a low level, thereby maintaining the motor rotation at a constant value $N_2$.

Figure 10:
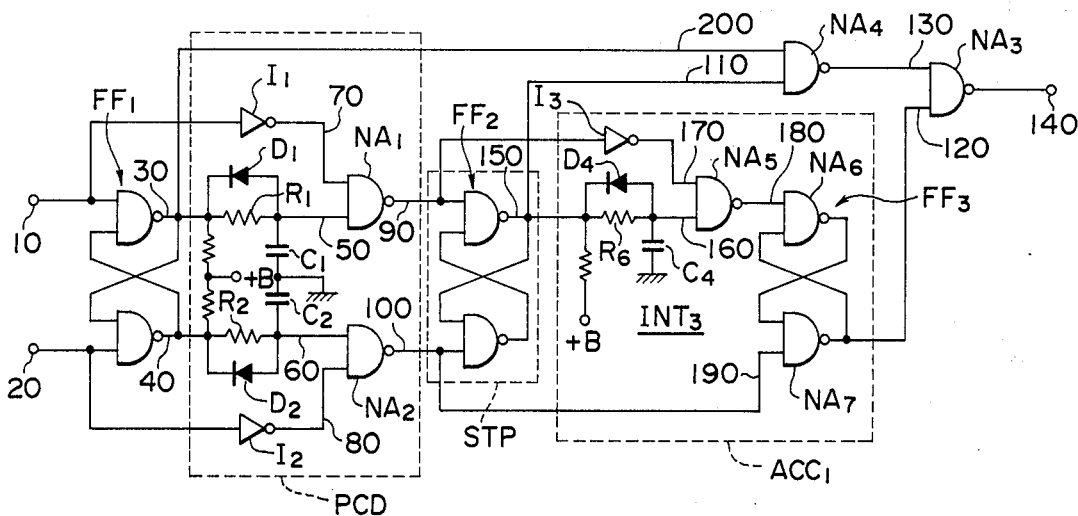
FIG. 10 is a circuit diagram of a drive control circuit for d.c. motor which is constructed in accordance with another embodiment of the invention.

FIG. 10 shows another embodiment of the invention which provides a more stable operation of the motor under varying load conditions and in which the acceleration circuit shown in FIG. 4 is replaced by an alternative arrangement. It should be understood, however, that parts corresponding to those shown in FIG. 4 are designated by like reference characters. An acceleration circuit $ACC_1$ comprises an integrator circuit $INT_3$, a diode $D_4$, an inverter $I_3$, NAND gate $NA_5$ and RS flipflop $FF_3$. The input of the integrator circuit $INT_3$ is connected with an output terminal 150 of RS flipflop $FF_2$ while its output is connected with one input terminal 160 of NAND gate $NA_5$. The integrator circuit $INT_3$ comprises a resistor $R_6$ and a capacitor $C_4$, and the diode $D_3$ functions in the same manner as the diodes $D_1$, $D_2$ mentioned previously. The output terminal 90 of NAND gate $NA_1$ is connected with the other input terminal 170 of NAND gate $NA_5$ through the inverter $I_3$. An NAND product of the outputs from the inverter $I_3$ and the integrator circuit $INT_3$ is formed by NAND gate $NA_5$, the output of which is applied to an input terminal 180 of NAND gate $NA_6$ which forms a part of an RS flipflop $FF_3$. The flipflop $FF_3$ also includes NAND gate $NA_7$ having an input terminal 190 which is connected with the output terminal 100 of NAND gate $NA_2$. The output of the flipflop $FF_3$ is applied to the input terminal 120 of NAND gate $NA_3$.

In operation, assuming that more than one pulses are successively applied to the terminal 10, there will be at least one low level pulse produced at the output terminal 90 of NAND gate $NA_1$ to invert flipflop $FF_2$. The output terminal 150 of this flipflop assumes a high level H as does the input terminal 110 of NAND gate $NA_4$. The other input terminal 200 of NAND gate $NA_4$ receives a PLL output from the output 30 of flipflop $FF_1$, so that a low level PLL signal is produced at the output of gate $NA_4$. On the other hand, If more than one pulses successively appear at the output terminal 90 of NAND gate $NA_1$ after the output 150 of flipflop $FF_2$ is inverted to its H level, the resistor $R_6$ and the capacitor $C_4$ in the integrator circuit $INT_3$ maintains a high level at the input 160 of NAND gate $NA_5$. Since a high level pulse is applied simultaneously to the input terminal 170 of gate $NA_5$ through the inverter $I_3$, a negative pulse appears at the output of gate $NA_5$ to cause the output from flipflop $FF_3$, which comprises NAND gates $NA_6$ and $NA_7$, to be inverted to its lower level and maintained at such level. As a result, NAND gate $NA_3$ which receives the outputs from NAND gate $NA_4$ and flipflop $FF_3$ at its input terminals 120 and 130, respectively, is locked at a high output level H, maintaining the energization of the motor to cause its number of revolutions to increase with time.

When starting the motor, the output frequency from the associated tachogenerator G is low, so that the frequency of pulses applied to the terminal 20 also remains low. Therefore, more than one pulse will be applied to the terminal 10 from the standard frequency generator during an interval of pulses which are applied to the terminal 20. As the motor gains in the number of revolutions, and more than one low level pulse is applied in succession to the terminal 20 from the tachogenerator G, there will be produced at least one negative pulse at the output terminal 100 of NAND gate $NA_2$, causing an inversion of flipflops $FF_2$ and $FF_3$. Under this condition, the output from the flipflop $FF_2$ or the input terminal 110 of gate $NA_4$ will assume an L level, whereby the output of flipflop $FF_3$ assumes an H level as is the output from the gate $NA_4$. As a result, the output terminal 140 of gate $NA_3$ assumes an L level, producing a stop instruction to the motor to deenergize it.

Consequently, the number of revolutions of the motor gradually decreases according to its inertia of rotation. Thus, the pulse train applied to the terminal 20 will be gradually slowed down or the interval therebetween will increase, allowing a pair of pulses to be applied to the terminal 10 in succession. At this time, a low level pulse is produced at the output terminal 90 of gate $NA_1$, whereby flipflop $FF_2$ alone is inverted. Thus, the input terminal 110 of gate $NA_4$ assumes an H level, and a PLL signal will be applied to the input terminal 200 from the output 30 of flipflop $FF_1$, thereby applying a low level PLL signal to the input terminal 130 of gate $NA_3$. On the other hand, the output of flipflop $FF_3$ maintains an H level, so that there appears a PLL signal at the output 140 of gate $NA_3$.

Figure 11:
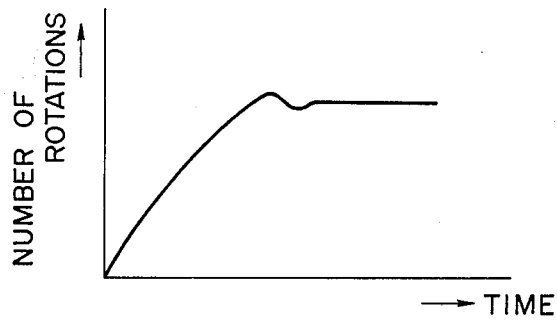
FIG. 11 graphically shows a change in the number of revolutions of the motor as the latter is started and accelerated to a predetermined number of revolutions, using the circuit illustrated in FIG. 10.

FIG. 11 graphically shows a change in the number of revolutions of the motor when the motor is started and brought up to a predetermined speed. This can be stated in terms of an output obtaining at the output terminal 140 of gate $NA_3$, as proceeding through an H level, an L level and PLL signal.

In accordance with the invention, the stability of the acceleration during rotation at a number of revolutions which is less than a value corresponding to a predetermined number of rotation is improved. This results in an improved starting characteristic and a reduced time required until the predetermined number of revolutions is reached. Since the invention eliminates the possibility that the motor rotation may be locked at a lower number of revolutions which has as a fractionally integral relationship with the intended number of revolutions, it is assured that the d.c. motor be brought up to the intended speed. The overall circuit may be formed by a bipolar TTL logic or CMOS or LSI arrangement, which advantageously simplifies the manufacturing and reduces the cost required.

Figure 12:
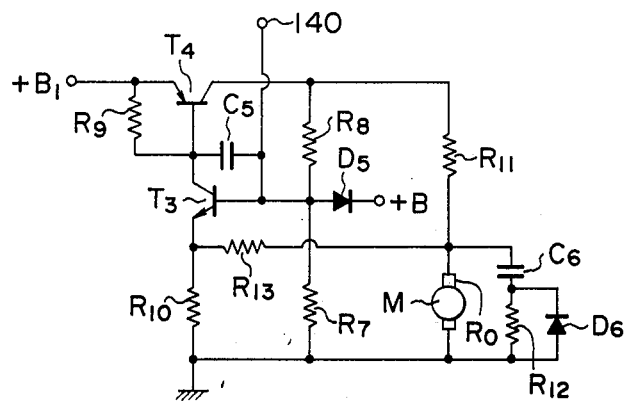
FIG. 12 is a circuit diagram of a d.c. motor drive circuit which may be connected with the output terminal of the circuit shown in FIG. 4 or 10 so as to be controlled thereby.

FIG. 12 shows a d.c. motor drive circuit which may be connected with the output terminal 140 of a control circuit as shown in FIG. 4 or FIG. 10. Specifically, the output terminal 140 is connected with the base of an NPN amplifier transistor $T_3$, which base is also connected with B+ through an overvoltage protecting diode $D_5$ and also to the ground through a resistor $R_7$. In addition, the base of the transistor $T_3$ is connected through an oscillation preventing capacitor $C_5$ to the collector thereof, and is also connected through a resistor $R_8$ with the collector of a PNP power transistor $T_4$. The collector of the transistor $T_3$ is connected with the base of the transistor $T_4$ and is also connected with a motor supply $B_1$ through a collector resistor $R_9$. The emitter of the transistor $T_3$ is connected with the ground through a resistor $R_{10}$. The emitter of the power transistor $T_4$ is connected with the supply $B_1$ while its collector is connected with the ground through a series circuit comprising a resistor $R_{11}$ and a motor M having an internal resistance $R_0$. A series circuit including a charging capacitor $C_6$ and a charging resistor $R_{12}$ is connected in shunt with the motor M, with the resistor $R_{12}$ being shunted by a discharge diode $D_6$. The junction between the motor M and the resistor $R_{11}$ is connected with the emitter of the transistor $T_3$ through a feedback resistor $R_{13}$.

In the above circuit arrangement, the resistors $R_7$, $R_8$, $R_{11}$ and the internal resistance $R_0$ of the motor form together a resistor bridge, and their respective resistances are chosen so as to produce a balance in the bridge circuit. When the motor M is set in rotation under this condition, there is produced across the base and emitter of the transistor $T_3$ a reverse electromotive force which is proportional to the number of rotations of the motor M, providing a negative speed feedback which is combined with the PLL signal from the output terminal 140 to assure a stable rotation of the motor M for all load variations or variations in the motor supply voltage. The rotation of the motor M can be further stabilized over a variation in the supply voltage, by replacing the feedback resistor $R_{13}$ by a Zener diode having its anode connected with the emitter, or by a diode having its cathode connected with the emitter.

Most desirably, the tachogenerator as used in the present invention is directly mounted on the rotary shaft of the motor, but it may be mechanically coupled with the shaft through a suitable joint, belt, gear, pulley or the like so as to produce a frequency signal which is proportional to or inversely proportional to the number of revolutions of the motor.

Having described the invention, what is claimed is:
1. A drive control circuit for a d.c. motor comprising
   (a) a standard frequency generator for producing a standard frequency signal;
   (b) a d.c. motor having a motor drive circuit associated therewith;
   (c) a tachogenerator for producing a frequency signal which is related to the number of revolutions of the motor;

(d) a flipflop having a first input terminal which receives the standard frequency signal and a second input terminal which receives the frequency signal from the tachogenerator, the flipflop being formed by a pair of NAND gates;

(e) a phase control condition detection circuit responsive to the standard frequency signal and an output of the flipflop, and to the frequency signal from the tachogenerator and an output from the flopflop, for detecting whether the standard frequency signal and the frequency signal from the tachogenerator alternately appear;

(f) a stop circuit responsive to an output from the detection circuit when the standard frequency is higher than the frequency produced by the tachogenerator for producing a signal which causes the number of revolutions of the d.c. motor to be increased;

(g) an acceleration circuit responsive to an output from the detection circuit when the standard frequency is higher than the frequency produced by the tachogenerator for producing a signal which causes the number of revolutions of the d.c. motor to be increased;

(h) a first NAND gate for receiving an output from the stop circuit and an output of the flipflop;

(i) a second NAND gate for receiving an output of the first NAND gate and an output of the acceleration circuit; and (j) means for applying an output of the second NAND gate to the motor drive circuit wherein said stop circuit being operative when the number of revolutions of the d.c. motor is below a predetermined value to release the inhibition of the drive to the motor, thereby enabling the motor to be driven again until the motor rotation reaches the predetermined number of revolutions.

2. A drive control circuit for a d.c. motor comprising:

(a) a standard frequency generator for producing a standard frequency signal;

(b) a d.c. motor having a motor drive circuit associated therewith;

(c) a tachogenerator for producing a frequency signal which is related to the number of revolutions of the motor;

(d) a flipflop having a first input terminal which receives the standard frequency signal and a second input terminal which receives the frequency signal from the tachogenerator, the flipflop being formed by a pair of NAND gates;

(e) a phase control condition detection circuit responsive to the standard frequency signal and an output of the flipflop, and to the frequency signal from the tachogenerator and an output from the flipflop, for detecting whether the standard frequency signal and the frequency signal from the tachogenerator alternately appear;

(f) a stop circuit responsive to an output from the detection circuit when the standard frequency is higher than the frequency produced by the tachogenerator for producing a signal which causes the number of revolutions of the d.c. motor to be increased;

(g) an acceleration circuit responsive to an output from the detection circuit and the output from the stop circuit when the standard frequency is higher than the tachogenerator frequency to produce a signal which causes the number of revolutions of the d.c. motor to be increased;

(h) a first NAND gate for receiving an output from the stop circuit and an output of the flipflop;

(i) a second NAND gate for receiving an output of the first NAND gate and an output of the acceleration circuit; and (j) means for applying an output of the second NAND gate to the motor drive circuit wherein said stop circuit is operative when the number of revolutions of the d.c. motor is below a predetermined value to release the inhibition of the drive to the motor, thereby enabling the motor to be driven again until the motor rotation reaches the predetermined number of revolutions, wherein said acceleration circuit is responsive when the standard frequency is higher than the tachogenerator frequency to produce a signal which causes the d.c. motor to be brought up to a predetermined number of revolutions, said second flipflop being responsive when the tachogenerator frequency is higher than the standard frequency to produce a signal which causes the drive to the d.c. motor to be inhibited and to produce a signal which releases the inhibit of the drive to the motor when the number of rotations fo the motor is below the predetermined value, thereby maintaining the motor rotation at the predetermined number of revolutions.

3. A drive control circuit for d.c. motor comprising (a) a signal source for producing a standard frequency signal;

(b) a d.c. motor having a motor drive circuit associated therewith;

(c) a tachogenerator for producing a frequency signal which is related to the number of revolutions of the motor;

(d) a first flipflop having a pair of input terminals which receive the standard frequency signal and the frequency signal from the tachogenerator, the flipflop being formed by a pair of NAND gates;

(e) a first and second integrator circuit said first integrator circuit being connected to output terminal of the NAND gate of the flipflop which receives the standard frequency signal and the second integrator circuit being connected to the output terminal of the other NAND gate of the flipflop which receives the tachogenerator signal, said first and second integrating circuits integrating the respective signals;

(f) a first NAND gate for receiving an output from the first integrator circuit and a phase inverted version of the standard frequency signal;

(g) a second NAND gate for receiving an output from the second integrator circuit and a phase inverted version of the tachogenerator signal;

(h) a second flipflop formed by a pair of NAND gates which are separately connected with the respective output terminals of the first and second gates;

(i) a third NAND gate for receiving an output from the second flipflop and an output of the NAND gate of the first flipflop which receives the standard frequency signal;

(j) an acceleration circuit which receives an output of the first NAND gate, an output of the second NAND gate and the output of the second flipflop;

(k) a fourth NAND gate for receiving an output of the third NAND gate and an output of the acceleration circuit; and (l) means for applying an output of the fourth NAND gate to the motor drive circuit, said acceleration circuit being responsive when the standard frequency is higher than the tachogenerator frequency to produce a signal which causes the d.c. motor to be brought up to a predetermined number of revolutions, said second flipflop being responsive when the tachogenerator frequency is higher than the standard frequency to produce a signal which causes the drive to the d.c. motor to be inhibited and to produce a signal which releases the inhibit of the drive to the motor when the number of rotations of the motor has reduced below the predetermined value, thereby maintaining the motor rotation at the predetermined number of revolutions.

4. A drive control circuit according to claim 3 in which the acceleration circuit comprises an inverter for inverting an output from the first NAND gate, a third integrator circuit for integrating an output of that gate of the second flipflop which is inverted by a signal from the first NAND gate, a fifth NAND gate for receiving an output from the inverter and the third integrator circuit, and a third flipflop formed by a pair of NAND gates and having a pair of input terminals which are adapted to receive an output from the fifth NAND gate and an output of the second NAND gate, thereby inhibiting the drive to the motor when the number of revolutions of the d.c. motor has increased above the predetermined value.

* * * * *